US012167750B2

(12) United States Patent
Jang et al.

(10) Patent No.: US 12,167,750 B2
(45) Date of Patent: Dec. 17, 2024

(54) ULTRASONIC-BASED AEROSOL GENERATION DEVICE

(71) Applicant: KT&G CORPORATION, Daejeon (KR)

(72) Inventors: Chul Ho Jang, Daejeon (KR); Gyoung Min Go, Daejeon (KR); Hyung Jin Bae, Daejeon (KR); Jang Won Seo, Daejeon (KR); Min Seok Jeong, Daejeon (KR); Jong Seong Jeong, Daejeon (KR); Jin Chul Jung, Daejeon (KR)

(73) Assignee: KT&G CORPORATION, Daejeon (KR)

(*) Notice: Subject to any disclaimer, the term of this patent is extended or adjusted under 35 U.S.C. 154(b) by 585 days.

(21) Appl. No.: 17/430,935

(22) PCT Filed: Mar. 8, 2021

(86) PCT No.: PCT/KR2021/002807
§ 371 (c)(1),
(2) Date: Aug. 13, 2021

(87) PCT Pub. No.: WO2021/215650
PCT Pub. Date: Oct. 28, 2021

(65) Prior Publication Data

US 2023/0320416 A1 Oct. 12, 2023

(30) Foreign Application Priority Data

Apr. 20, 2020 (KR) ........................ 10-2020-0047186

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/42* (2020.01); *A24F 40/44* (2020.01);
(Continued)

(58) Field of Classification Search
CPC .......... A24F 40/10; A24F 40/42; A24F 40/44; A24F 40/46
See application file for complete search history.

(56) References Cited

U.S. PATENT DOCUMENTS

2016/0213866 A1 7/2016 Tan
2018/0140014 A1 5/2018 Yu et al.
(Continued)

FOREIGN PATENT DOCUMENTS

CN 206025225 U 3/2017
CN 206043450 U 3/2017
(Continued)

OTHER PUBLICATIONS

International Search Report for PCT/KR2021/002807 dated Jun. 30, 2021 (PCT/ISA/237).
(Continued)

*Primary Examiner* — Christopher M Rodd
*Assistant Examiner* — Jennifer A Kessie
(74) *Attorney, Agent, or Firm* — Sughrue Mion, PLLC

(57) ABSTRACT

Provided herein is an ultrasonic-based aerosol generation device. The aerosol generation device according to some embodiments of the present disclosure includes a liquid reservoir configured to store an aerosol-forming substrate in a liquid state, a wick configured to absorb the stored aerosol-forming substrate, an ultrasonic vibrator configured to vaporize the absorbed aerosol-forming substrate through ultrasonic waves to generate an aerosol, and a controller configured to control the ultrasonic vibrator. Here, at least a
(Continued)

portion of the wick and at least a portion of the ultrasonic vibrator may be implemented to have a flat shape and may be disposed to come in close contact with each other. In this way, a vaporization area may be maximized, and vapor production may be significantly enhanced.

14 Claims, 7 Drawing Sheets

(51) Int. Cl.

| | |
|---|---|
| ***A24F 40/42*** | (2020.01) |
| ***A24F 40/44*** | (2020.01) |
| ***A24F 40/46*** | (2020.01) |
| ***A24F 40/48*** | (2020.01) |
| ***A24F 40/50*** | (2020.01) |
| ***B05B 17/06*** | (2006.01) |

(52) U.S. Cl.

CPC .............. *A24F 40/46* (2020.01); *A24F 40/48* (2020.01); *A24F 40/50* (2020.01); *B05B 17/0684* (2013.01)

(56) References Cited

U.S. PATENT DOCUMENTS

| | | | | |
|---|---|---|---|---|
| 2020/0009600 | A1* | 1/2020 | Tan | B05B 12/08 |
| 2021/0178090 | A1* | 6/2021 | Lahoud | A24F 40/44 |

FOREIGN PATENT DOCUMENTS

| | | | |
|---|---|---|---|
| CN | 206238428 | U | 6/2017 |
| CN | 206251936 | U | 6/2017 |
| CN | 206586397 | U | 10/2017 |
| CN | 208837110 | U | 5/2019 |
| CN | 209628643 | U | 11/2019 |
| EP | 1 736 065 | A1 | 12/2006 |
| GB | 2566766 | A | 3/2019 |
| JP | 2019-524120 | A | 9/2019 |
| KR | 20-2011-0001457 | U | 2/2011 |
| KR | 10-2018-0079298 | A | 7/2018 |
| KR | 10-2018-0122479 | A | 11/2018 |
| KR | 2019/072969 | A1 | 4/2019 |
| WO | 2020/007321 | A1 | 1/2020 |
| WO | 2020/023535 | A1 | 1/2020 |

OTHER PUBLICATIONS

Office Action dated Aug. 23, 2022 issued by the Japanese Patent Office in Japanese Application No. 2021-532129.

Office Action issued Jan. 15, 2022 in Korean Application No. 10-2020-0047186.

Extended European Search Report issued Feb. 28, 2022 in European Application No. 21736239.1.

Communication issued Jul. 5, 2023 in European Application No. 21 736 239.1.

* cited by examiner

[FIG. 1]
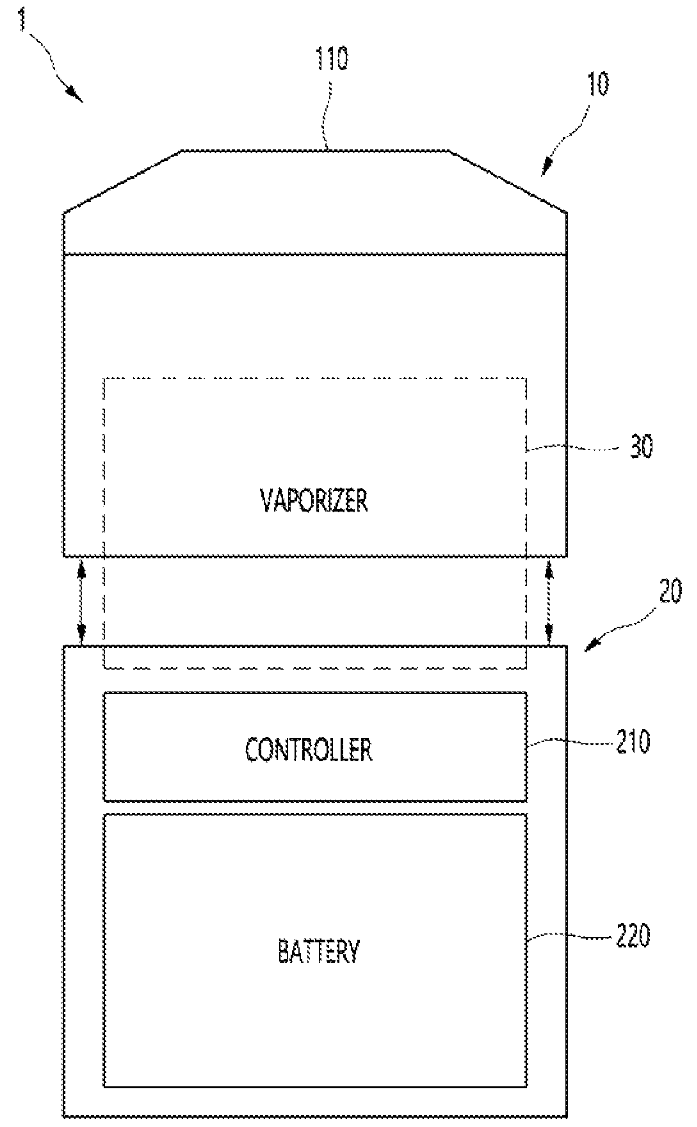

[FIG. 2]
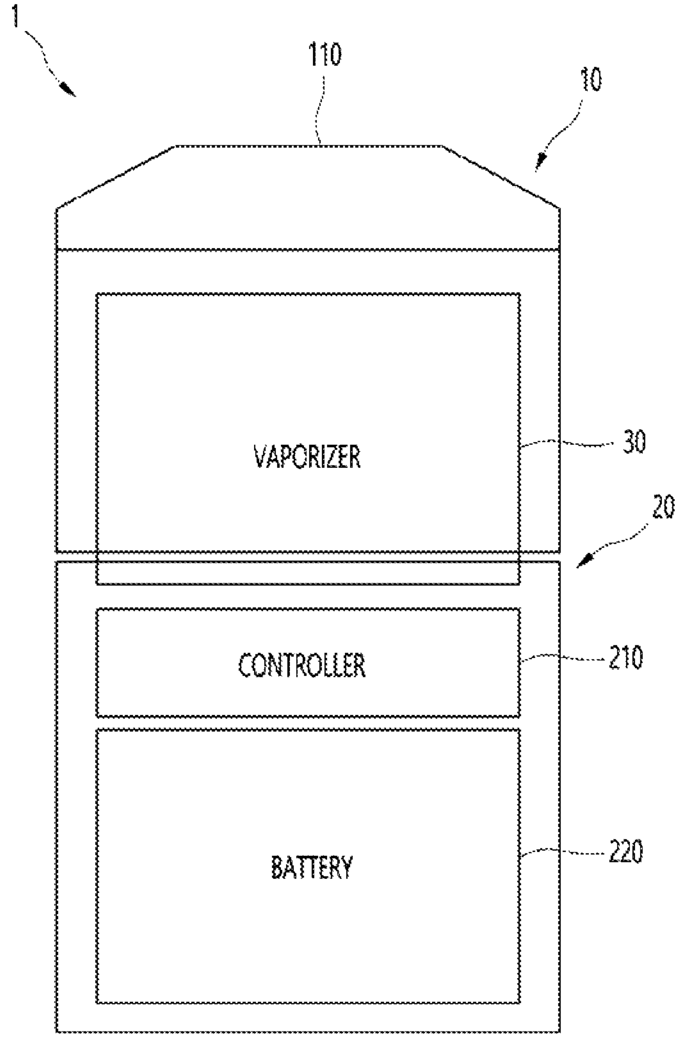

[FIG. 3]
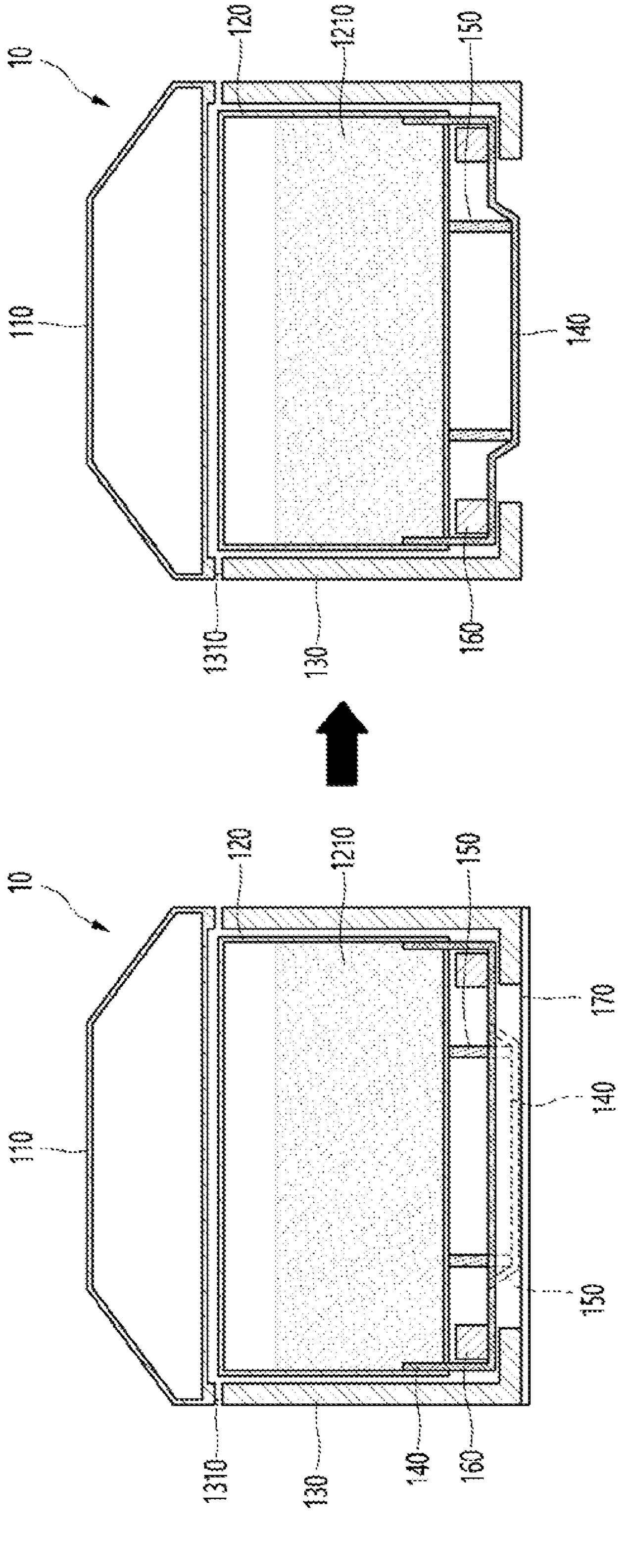

[FIG. 4]
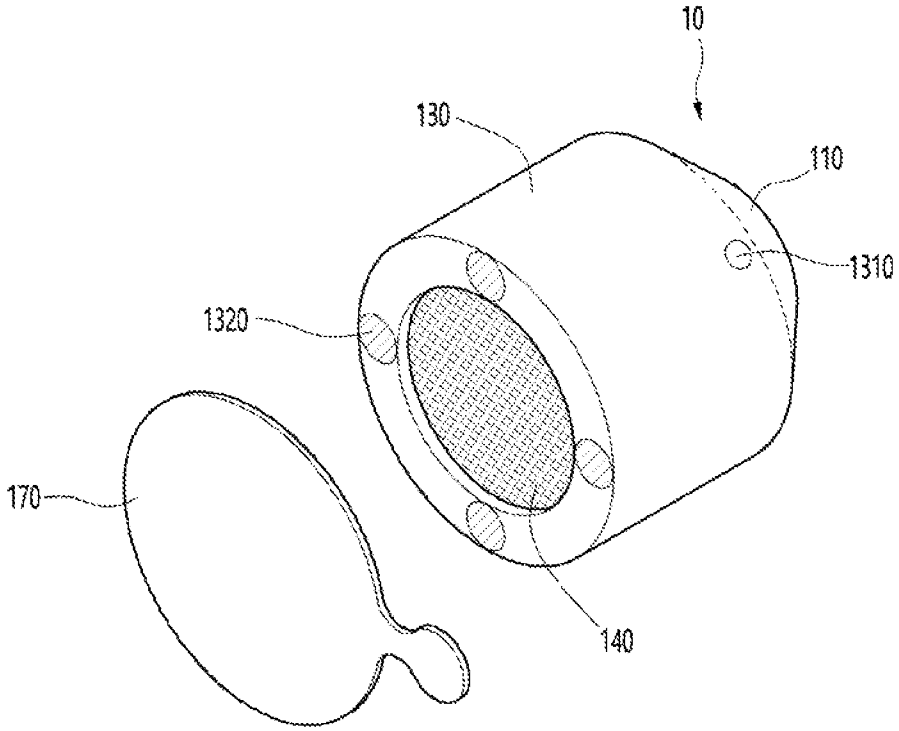

[FIG. 5]
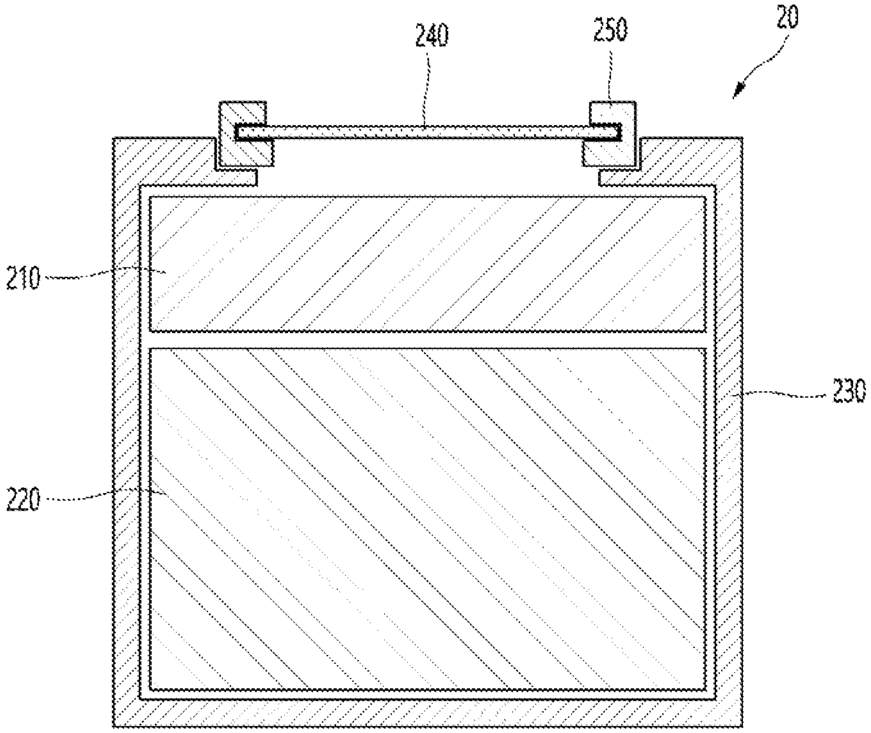

[FIG. 6]
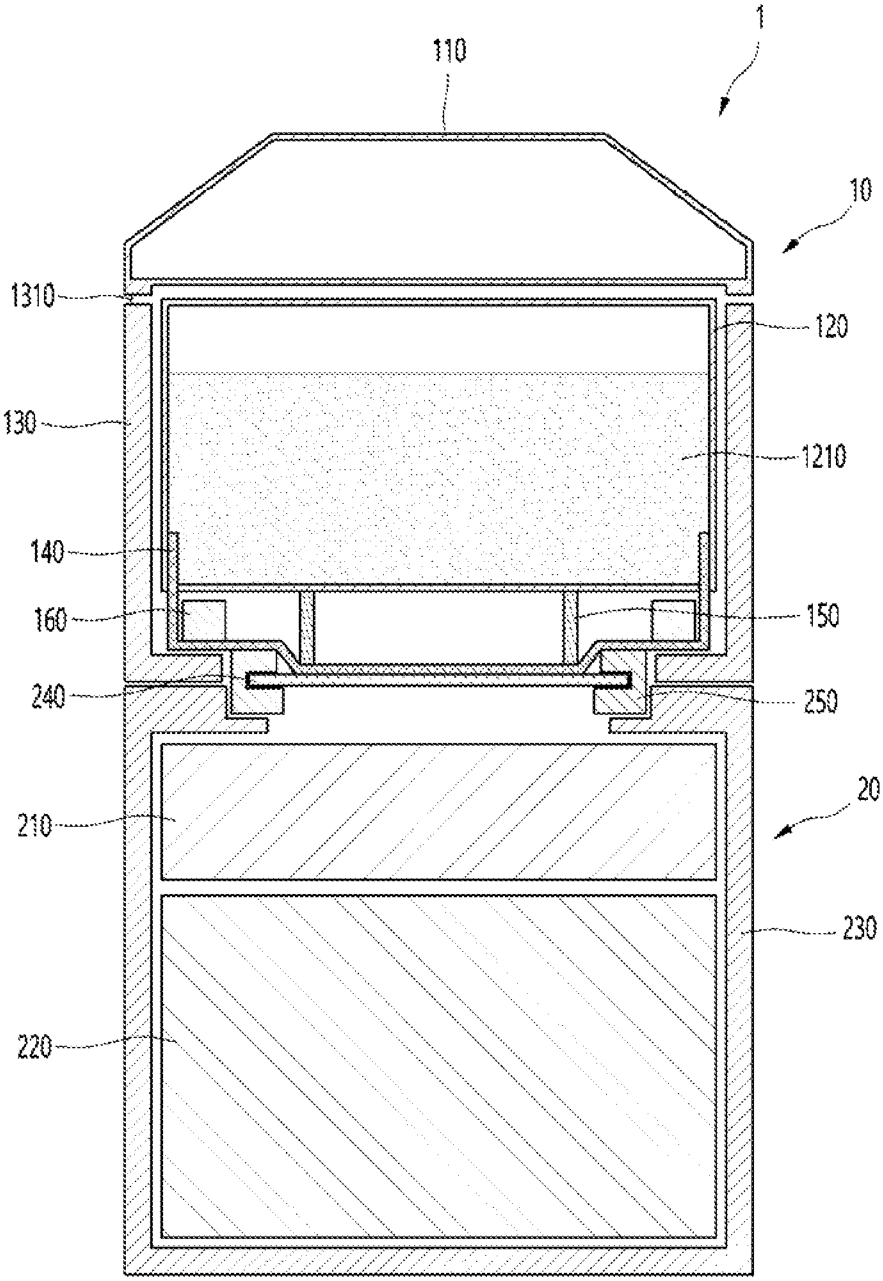

[FIG. 7]
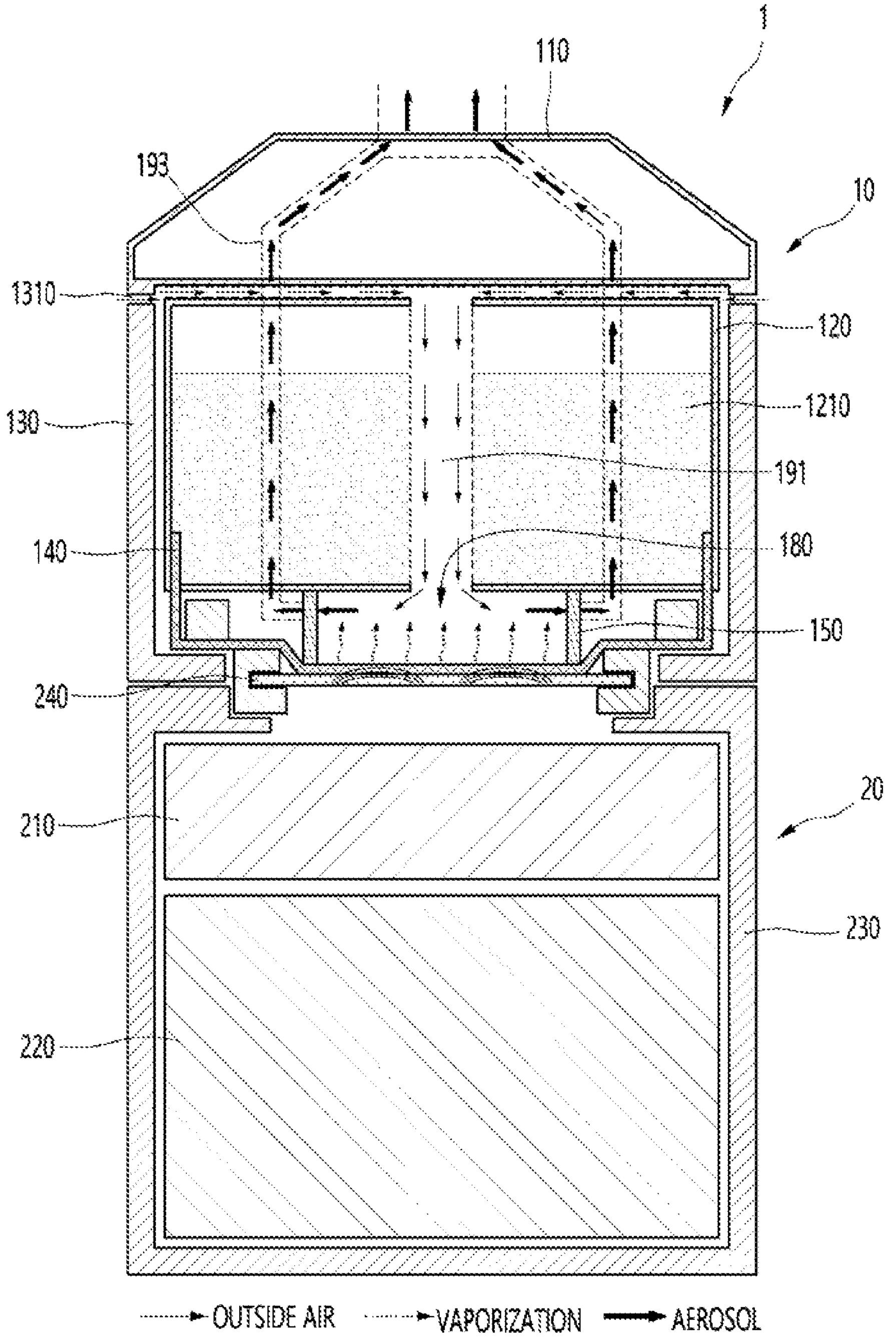

ULTRASONIC-BASED AEROSOL GENERATION DEVICE

TECHNICAL FIELD

The present disclosure relates to an ultrasonic-based aerosol generation device, and more particularly, to an ultrasonic-based aerosol generation device with a new structure capable of enhancing vapor production and smoking sensation and reducing cartridge replacement costs.

BACKGROUND ART

In recent years, demand for alternative methods that overcome the disadvantages of general cigarettes has increased. For example, demand for devices (so-called liquid-type aerosol generation devices) that vaporize a liquid aerosol-forming substrate to generate an aerosol has increased. Recently, ultrasonic-based aerosol generation devices that vaporize a liquid through ultrasonic vibrations have been proposed.

Most of the ultrasonic-based aerosol generation devices which have been proposed so far adopt a cartridge (e.g., cartomizer) replacement structure in consideration of user convenience. Also, a replaceable cartridge basically consists of a liquid reservoir, a wick, and an ultrasonic vibrator. However, in such a structure, since the ultrasonic vibrator, which is a relatively expensive component, is embedded in the cartridge, a cartridge replacement cost (or cartridge unit cost) is increased.

In this respect, some of the ultrasonic-based aerosol generation devices adopt a method of refilling liquid without replacing a cartridge. However, the liquid refill method complicates the structure of the aerosol generation device and causes an inconvenience of a user having to refill the liquid. Further, in some cases, the user's clothes or body may be stained with the liquid during the liquid refill process, and this may cause considerable discomfort to the user.

DISCLOSURE

Technical Problem

Some embodiments of the present disclosure are directed to providing an ultrasonic-based aerosol generation device with a new structure capable of reducing a cartridge replacement cost (or cartridge unit cost).

Some other embodiments of the present disclosure are directed to providing an ultrasonic-based aerosol generation device capable of enhancing vapor production and smoking sensation.

Objectives of the present disclosure are not limited to the above-mentioned objectives, and other unmentioned objectives should be clearly understood by those of ordinary skill in the art to which the present disclosure pertains from the description below.

Technical Solution

An ultrasonic-based aerosol generation device according to some embodiments of the present disclosure includes a liquid reservoir configured to store an aerosol-forming substrate in a liquid state, a wick configured to absorb the stored aerosol-forming substrate, an ultrasonic vibrator configured to vaporize the absorbed aerosol-forming substrate through ultrasonic waves to generate an aerosol, and a controller configured to control the ultrasonic vibrator. Here, at least a portion of the wick and at least a portion of the ultrasonic vibrator may have a flat shape.

In some embodiments, a thickness of the flat portion of the wick may be 1 mm or less.

In some embodiments, an area of the wick may be larger than an area of the ultrasonic vibrator.

In some embodiments, the flat portions of the wick and the ultrasonic vibrator may be disposed to come in close contact with each other.

In some embodiments, the flat portion of the wick may be a central portion of the wick, and the ultrasonic-based aerosol generation device may further include a damper which is disposed on an outer peripheral portion of the wick to fix the outer periphery portion of the wick.

In some embodiments, the ultrasonic-based aerosol generation device may further include a damper which is disposed in close contact with the ultrasonic vibrator to absorb the vibrations of the ultrasonic vibrator.

In some embodiments, an aerosol generation region may be formed adjacent to the flat portion of the wick, and the ultrasonic-based aerosol generation device may further include a first airflow path through which outside air is introduced into the vicinity of the center of the aerosol generation region and a second airflow path through which the generated aerosol is moved from the vicinity of an outer periphery of the aerosol generation region toward a mouthpiece.

In some embodiments, the liquid reservoir and the wick may constitute at least a portion of a replaceable cartridge, and the ultrasonic vibrator and the controller may constitute at least a portion of a control main body coupled to the cartridge.

Advantageous Effects

According to various embodiments of the present disclosure, at least a portion of a wick and at least a portion of an ultrasonic vibrator can be implemented to have a flat shape, and the flat portions can be disposed to come in close contact with each other. Such a structure maximizes a vaporization area (or ultrasonic vibration accommodation area) of the wick, thereby significantly enhancing vapor production of the aerosol generation device.

Also, the ultrasonic vibrator, which is a relatively expensive component, can be disposed at a control main body side instead of being disposed in a cartridge. Accordingly, a cartridge replacement cost (or cartridge unit cost) can be significantly reduced.

In addition, airflow paths can be formed so that outside air is introduced into the vicinity of the center of an aerosol generation region (or vaporization region), which is formed adjacent to the wick, and so that the aerosol is moved toward a mouthpiece through the outer periphery of the aerosol generation region. Such an airflow path structure allows outside air and a vaporized aerosol-forming substrate to be appropriately mixed so that a high-quality aerosol is generated. For example, since the introduced air can sweep across the entire vaporization region of the wick and be appropriately mixed with the vaporized aerosol-forming substrate, the high-quality aerosol can be generated. Accordingly, smoking sensation of the user can be significantly enhanced.

The advantageous effects according to the technical idea of the present disclosure are not limited to the above-mentioned advantageous effects, and other unmentioned advantageous effects should be clearly understood by those of ordinary skill in the art from the description below.

DESCRIPTION OF DRAWINGS

FIGS. 1 and 2 are exemplary views schematically illustrating a structure of an ultrasonic-based aerosol generation device according to some embodiments of the present disclosure.

FIGS. 3 and 4 are exemplary views illustrating a detailed structure of a cartridge according to some embodiments of the present disclosure.

FIG. 5 is an exemplary view illustrating a detailed structure of a control main body according to some embodiments of the present disclosure.

FIG. 6 is an exemplary view illustrating a detailed structure of the ultrasonic-based aerosol generation device and a state in which the cartridge and control main body are coupled to each other according to some embodiments of the present disclosure.

FIG. 7 is an exemplary view illustrating an airflow path structure of the ultrasonic-based aerosol generation device according to some embodiments of the present disclosure.

MODES OF THE INVENTION

Hereinafter, exemplary embodiments of the present disclosure will be described in detail with reference to the accompanying drawings. Advantages and features of the present disclosure and a method of achieving the same should become clear with embodiments described in detail below with reference to the accompanying drawings. However, the technical idea of the present disclosure is not limited to the following embodiments and may be implemented in various different forms. The embodiments make the technical idea of the present disclosure complete and are provided to completely inform those of ordinary skill in the art to which the present disclosure pertains of the scope of the present disclosure. The technical idea of the present disclosure is defined only by the scope of the claims.

In assigning reference numerals to components of each drawing, it should be noted that the same reference numerals are assigned to the same components as much as possible even when the components are illustrated in different drawings. Also, in describing the present disclosure, when detailed description of a known related configuration or function is deemed as having the possibility of obscuring the gist of the present disclosure, the detailed description thereof will be omitted.

Unless otherwise defined, all terms including technical or scientific terms used herein have the same meaning as commonly understood by those of ordinary skill in the art to which the present disclosure pertains. Terms defined in commonly used dictionaries should not be construed in an idealized or overly formal sense unless expressly so defined herein. Terms used herein are for describing the embodiments and are not intended to limit the present disclosure. In the following embodiments, a singular expression includes a plural expression unless the context clearly indicates otherwise.

Also, in describing components of the present disclosure, terms such as first, second, A, B, (a), and (b) may be used. Such terms are only used for distinguishing one component from another component, and the essence, order, sequence, or the like of the corresponding component is not limited by the terms. In a case in which a certain component is described as being "connected," "coupled," or "linked" to another component, it should be understood that, although the component may be directly connected or linked to the other component, still another component may also be "connected," "coupled," or "linked" between the two components.

The terms "comprises" and/or "comprising" used herein do not preclude the presence or addition of one or more components, steps, operations, and/or devices other than those mentioned.

Some terms used in various embodiments of the present disclosure will be clarified prior to description thereof.

In the following embodiments, "aerosol-forming substrate" may refer to a material that is able to form an aerosol. The aerosol may include a volatile compound. The aerosol-forming substrate may be a solid or liquid. For example, solid aerosol-forming substrates may include solid materials based on tobacco raw materials such as reconstituted tobacco leaves, shredded tobacco, and reconstituted tobacco, and liquid aerosol-forming substrates may include liquid compositions based on nicotine, tobacco extracts, and/or various flavoring agents. However, the scope of the present disclosure is not limited to the above-listed examples. In the following embodiments, "liquid" may refer to a liquid aerosol-forming substrate.

In the following embodiments, "aerosol generation device" may refer to a device that generates an aerosol using an aerosol-forming substrate in order to generate an aerosol that can be inhaled directly into the user's lungs through the user's mouth.

In the following embodiments, "puff" refers to inhalation by a user, and the inhalation may refer to a situation in which a user draws smoke into his or her oral cavity, nasal cavity, or lungs through the mouth or nose.

Hereinafter, various embodiments of the present disclosure will be described in detail with reference to the accompanying drawings.

FIGS. 1 and 2 are exemplary views schematically illustrating a structure of an ultrasonic-based aerosol generation device 1 according to some embodiments of the present disclosure.

As illustrated in FIG. 1 or 2, the ultrasonic-based aerosol generation device 1 may include a cartridge 10 and a control main body 20. However, only the components relating to the embodiment of the present disclosure are illustrated in FIG. 1 or 2. Therefore, those of ordinary skill in the art to which the present disclosure pertains should understand that the ultrasonic-based aerosol generation device 1 may further include general-purpose components other than the components illustrated in FIG. 1 or 2. Hereinafter, each component of the aerosol generation device 1 will be described.

The cartridge 10 may refer to a container configured to store an aerosol-forming substrate in a liquid state. Also, in some cases, the cartridge 10 may further provide some or all of the functions of a mouthpiece and a vaporizer (e.g., cartomizer). For example, the cartridge 10 may be configured to include a mouthpiece 110 and some components of a vaporizer 30 (see FIG. 1). As another example, the cartridge 10 may be configured to include the mouthpiece 110 and all the components of the vaporizer 30. As still another example, the cartridge 10 may be configured to exclude the mouthpiece 110.

FIG. 1 illustrates an example in which the cartridge 10 is coupled to the control main body 20 to form an upper portion of the aerosol generation device 1 and the control main body 20 forms a lower portion of the aerosol generation device 1, but the scope of the present disclosure is not limited to such a structure. In some other embodiments, the cartridge 10 may be a component embedded in an upper case of the aerosol generation device 1.

In some embodiments, the cartridge 10 may be a replaceable component. That is, the cartridge 10 may be replaced with a new cartridge instead of being refilled with liquid when the liquid therein is used up. In such a case, since the overall structure of the aerosol generation device may be simplified, advantages in terms of manufacturing processes (e.g., reduction of manufacturing costs, reduction of defect rates, etc.) may be secured. Further, since the inconvenience of a user having to directly refill the cartridge with liquid is eliminated, the market competitiveness of the product may be improved. The cost of replacing the cartridge 10 may be a problem, but this problem may be addressed by excluding some components (that is, an ultrasonic vibrator which is relatively expensive) of the vaporizer 30. Hereinafter, description will be continued assuming that the cartridge 10 is a replaceable component. However, it should be noted that various embodiments or technical ideas described below may also apply to cases in which the cartridge 10 is not a replaceable component. For example, the form of a wick or a coupling structure between the wick and the ultrasonic vibrator for maximizing a vaporization area (refer to the description relating to FIGS. 3 to 6), an airflow path structure capable of enhancing vapor production and smoking sensation (refer to the description relating to FIG. 7), and the like may be applied to various types of aerosol generation devices regardless of whether the cartridge 10 is replaceable.

As conceptually illustrated in FIG. 1, the cartridge 10 according to an embodiment may include the mouthpiece 110 and some components of the vaporizer 30. More specifically, the vaporizer 30 may include a liquid reservoir 120 (see FIG. 3) configured to store an aerosol-forming substrate in a liquid state, a wick 140 (see FIG. 3) configured to absorb the stored liquid, and an ultrasonic vibrator 240 (see FIG. 5) configured to vaporize the absorbed liquid by ultrasonic waves (i.e., ultrasonic vibrations). Among these components, the liquid reservoir 120 and the wick 140 may be included in the cartridge 10. On the other hand, the ultrasonic vibrator 240 may be included in the control main body 20. In such a case, the vaporizer 30 may be configured as the cartridge 10 and the control main body 20 are coupled to each other, and since the ultrasonic vibrator, which is a relatively expensive component, is excluded from the cartridge 10, the replacement cost (or unit cost) of the cartridge 10 may be significantly reduced. The structure of the cartridge 10 will be described in more detail below with reference to FIG. 3 and so on.

Next, the control main body 20 may perform an overall control function for the aerosol generation device 1. As illustrated in FIG. 2, the control main body 20 may be coupled to the cartridge 10. In a case in which the cartridge 10 is a component embedded in the aerosol generation device 1, the control main body 20 may be coupled to an upper case of the aerosol generation device 1 that includes the cartridge 10.

As illustrated in FIGS. 1 and 2, the control main body 20 may include a controller 210 and a battery 220. Hereinafter, the controller 210 and the battery 220 will be briefly described.

The controller 210 may control the overall operation of the aerosol generation device 1. For example, the controller 210 may control the operation of the vaporizer 30 and the battery 220 and also control the operation of other components included in the aerosol generation device 1. The controller 210 may control the power supplied by the battery 220 and the vibration frequency, amplitude, or the like of the ultrasonic vibrator 240 (see FIG. 5). In a case in which the aerosol generation device 1 further includes a heater (not illustrated), the controller 210 may also control a heating temperature of the heater (not illustrated).

Also, the controller 210 may check a state of each of the components of the aerosol generation device 1 and determine whether the aerosol generation device 1 is in an operable state.

The controller 210 may be implemented with at least one processor. The processor may also be implemented with an array of a plurality of logic gates or implemented with a combination of a general-purpose microprocessor and a memory which stores a program that may be executed by the microprocessor. Also, those of ordinary skill in the art to which the present disclosure pertains should understand that the controller 210 may also be implemented with other forms of hardware.

Next, the battery 220 may supply the power used to operate the aerosol generation device 1. For example, the battery 220 may supply power to allow the ultrasonic vibrator 240 (see FIG. 5), which constitutes the vaporizer 30, to generate ultrasonic waves or may supply power required for the controller 210 to operate.

Also, the battery 220 may supply power required to operate electrical components such as a display (not illustrated), a sensor (not illustrated), and a motor (not illustrated) which are installed in the aerosol generation device 1.

The structure of the control main body 20 will be described in more detail below with reference to FIG. 5 and so on.

As mentioned above, the cartridge 10 may be coupled to the control main body 20. The coupling may be performed using various methods. Specific examples include a method using a magnet, a mechanically-fastening method using a hook or the like, etc. However, the scope of the present disclosure is not limited to such examples, and the method of coupling the two components 10 and 20 may be designed in various ways in consideration of user convenience, manufacturing costs of the aerosol generation device, and the like.

The ultrasonic-based aerosol generation device 1 according to some embodiments of the present disclosure has been schematically described above with reference to FIGS. 1 and 2. Hereinafter, the structures of the cartridge 10 and the control main body 20, which constitute the aerosol generation device 1, will be described in more detail with reference to FIG. 3 and so on.

FIG. 3 is an exemplary view illustrating a detailed structure of the cartridge 10 according to some embodiments of the present disclosure.

Referring to FIG. 3, the cartridge 10 may include a case 130, the mouthpiece 110, the liquid reservoir 120, and the wick 140. However, only the components relating to the embodiment of the present disclosure are illustrated in FIG. 3. Therefore, those of ordinary skill in the art to which the present disclosure pertains should understand that the cartridge 10 may further include general-purpose components other than the components illustrated in FIG. 3. Hereinafter, each component of the cartridge 10 will be described.

The case 130 may form an exterior of the cartridge 10. FIG. 3 illustrates the case 130 as being distinct from an outer wall of the liquid reservoir 120 and the mouthpiece 110, but this is merely for convenience of understanding, and the case 130 may also serve as the outer wall of the liquid reservoir 120 and/or the mouthpiece 110.

As illustrated at the right side in FIG. 3, the case 130 may has an open lower end portion, and the cartridge 10 may be coupled to the control main body 20 through the open lower end portion. Also, as the cartridge 10 is coupled to the control main body 20, the wick 140 may be disposed in close contact with the ultrasonic vibrator 240 (see FIG. 5) which is located in the control main body 20.

Next, the mouthpiece 110 may be located at one end of the aerosol generation device 1 and may come in contact with the oral region of the user to allow inhalation of the aerosol generated in the cartridge 10. In other words, when the user holds the mouthpiece 110 in his or her mouth and inhales, the aerosol generated in the cartridge 10 may be delivered to the user through the mouthpiece 110.

Next, the liquid reservoir 120 may store an aerosol-forming substrate 1210 in a liquid state. FIG. 3 illustrates an example in which the liquid reservoir 120 has a single storage space, but the liquid reservoir 120 may also have a plurality of storage spaces. For example, the liquid reservoir 120 have a plurality of storage spaces to separately store aerosol-forming substrates having different components or composition ratios.

Next, the wick 140 may absorb the aerosol-forming substrate 1210 in the liquid state that is stored in the liquid reservoir 120. For example, as illustrated in FIG. 3, at least a portion (e.g., both ends) of the wick 140 may be disposed to come in contact with the aerosol-forming substrate 1210, and the wick 140 may absorb the aerosol-forming substrate 1210 through the capillary action.

The wick 140 may be made of a material capable of absorbing the liquid 1210 through the capillary action, such as a porous material. For example, the wick 140 may be made of cotton, silica, or the like. However, the scope of the present disclosure is not limited to such examples.

In some embodiments, as illustrated in FIG. 3, at least a portion of the wick 140 may have a flat shape. For example, a central portion of the wick 140 that comes in close contact with the ultrasonic vibrator 240 (see FIG. 5) may have a flat shape. The ultrasonic vibrator 240 may also have a flat shape. In such a case, the ultrasonic waves generated by the ultrasonic vibrator 240 are directly transmitted to the wick 140 and a vaporization area of the wick 140 is maximized such that vapor production is significantly enhanced. The flat portion of the wick 140 may have a disk shape, but the scope of the present disclosure is not limited thereto. The flat portion of the wick 140 may also be implemented in a different shape such as the shape of a quadrilateral plate.

In the embodiment described above, preferably, a thickness of the flat portion of the wick 140 may be less than or equal to about 1 mm. More preferably, the thickness of the flat portion may be less than or equal to about 0.9 mm, 0.8 mm, or 0.7 mm. Still more preferably, the thickness of the flat portion may be less than or equal to about 0.6 mm, 0.5 mm, or 0.4 mm. Within such numerical ranges, the liquid absorbed into the wick 140 may be rapidly vaporized, and thus vapor production may be enhanced. Otherwise, if the wick 140 is too thick, ultrasonic vibrations may be absorbed by the wick 140, vaporization performance may be degraded, and a liquid may leak due to a vaporization rate lower than an absorption rate.

Also, the entire area of the wick 140 may be larger than the area of the ultrasonic vibrator 240 (see FIG. 5). For example, an area of the flat portion of the wick 140 may be similar to the area of the ultrasonic vibrator 240, and the entire area of the wick 140 may exceed the area of the ultrasonic vibrator 240. In such a case, as will be described below (refer to the description below), since the wick 140 may be moved toward the open lower end portion and the flat portion of the wick 140 may come in close contact with the ultrasonic vibrator 240, covering the ultrasonic vibrator 240, vaporization performance may be improved.

In some embodiments, the cartridge 10 may further include an elastic body 150 configured to elastically support the wick 140. The elastic body 150 may be made of an arbitrary material which has elasticity (that is, which is able to be compressed and expanded). FIG. 3 illustrates an example in which two elastic bodies 150 are connected to the wick 140, but this is merely for convenience of understanding, and the number of elastic bodies 150 may vary. For example, in a case in which the flat portion of the wick 140 has a disk shape, four elastic bodies 150 may be disposed at 90° intervals, or a single elastic body 150 formed in a ring shape may be disposed to extend along the circumference of the disk-shaped portion. The functions and effects of the elastic body 150 will be described in more detail below.

As mentioned above, in some embodiments, the wick 140 may be located in the cartridge 10, and the ultrasonic vibrator 240 (see FIG. 5) may be located in the control main body 20. Also, a vaporizing function may be implemented as the cartridge 10 and the control main body 20 are coupled to each other. If the position of the wick 140 is fixed, even when the cartridge 10 and the control main body 20 are coupled to each other, inevitably, there exists a gap between the wick 140 and the ultrasonic vibrator 240. In this case, ultrasonic waves are not able to be directly transmitted to the wick 140, and thus vaporization performance may be degraded.

The elastic body 150 is for addressing the above problem and may serve to move the wick 140 toward the open lower end portion as the cartridge 10 is coupled to the control main body 20 (or a sealing member 170, which will be described below, is removed). Specifically, as the elastic body 150 in a compressed state is expanded, the wick 140 may be moved toward the open lower end portion (refer to the right side in FIG. 3). As will be described below, since an open upper end portion of the control main body 20 is coupled to the open lower end portion of the cartridge 10 and the ultrasonic vibrator 240 (see FIG. 5) is located at the open upper end portion of the control main body 20, as the wick 140 is moved toward the open lower end portion, the wick 140 may be disposed to come in close contact with the ultrasonic vibrator 240 (see FIG. 6).

In some embodiments, the cartridge 10 may further include the sealing member 170 sealing the open lower end portion. For example, as illustrated in FIG. 4, the open lower end portion of the cartridge 10 may be sealed by a protective tape 170. The sealing member 170 may serve to prevent damage to the wick 140 during storage and transportation of the cartridge 10 and maintain cleanliness of the cartridge 10. During replacement of the cartridge, the user may remove the sealing member 170 and couple a new cartridge 10 to the control main body 20. FIG. 4 illustrates an example in which the wick 140 having a disk shape is embedded in the cartridge 10 having a cylindrical shape. An air hole 1310 is a hole through which outside air is introduced. Also, a circular region 1320 disposed on a lower portion of the case 130 is a coupling portion, which may be implemented with a magnetic material or a hook to allow coupling with the control main body 20. However, the coupling portion 1320 may also be implemented in other ways.

The description of the cartridge 10 will be continued by referring back to FIG. 3.

In some embodiments, the cartridge 10 may further include a damper 160 disposed in the vicinity of the outer periphery of the wick 140. FIG. 3 illustrates an example in which two dampers 160 are disposed on the wick 140, but this is merely for convenience of understanding, and the number of dampers 160 may vary. For example, if the flat portion of the wick 140 has a disk shape, four dampers 160 may be disposed at 90° intervals, or a single damper 160 formed in a ring shape may be disposed to extend along the circumference of the disk-shaped portion. The damper 160 may serve to absorb the ultrasonic vibrations that have reached the wick 140 so that the ultrasonic vibrations are not transmitted to the outside of the case 130. Therefore, preferably, the damper 160 may be made of a material which is capable of absorbing vibrations and maintaining its physical and chemical properties (e.g., a material in which physical and chemical changes do not occur upon contact with a liquid), such as a silicone material. Also, the damper 160 may fix an outer peripheral portion of the wick 140 so that the central portion (that is, the flat portion) of the wick 140 is sensitively reacts to ultrasonic vibrations. Accordingly, the vaporization rate and vapor production may be further enhanced.

Also, in some embodiments, the cartridge 10 may further include a heater (not illustrated). The heater may be disposed around the wick 140 to heat the liquid 1210 absorbed into the wick 140 so that vaporization by the ultrasonic waves is accelerated. The heater may operate as an auxiliary component to assist vaporization of the liquid 1210. For example, since the aerosol-forming substrate 1210 is a viscous liquid, it may be difficult to obtain satisfactory vaporization performance just by ultrasonic vibrations, and in such a case, the vaporization performance of the aerosol generation device may be improved through the heater (not illustrated). A heating temperature of the heater may be set to be much lower than a temperature of a heater of a typical heating-type aerosol generation device, and thus an increase in power consumption may be insignificant. The heater may be controlled by the controller 210 using various control methods.

For example, the controller 210 may increase the heating temperature of the heater every time a puff by the user is detected. Puff detection may be performed using an airflow sensor, but the scope of the present disclosure is not limited thereto.

As another example, the controller 210 may constantly maintain the heating temperature of the heater during smoking regardless of whether a puff by the user occurs. In such a case, during smoking, the liquid absorbed into the wick 140 may maintain a state in which it is easily vaporized. Also, every time a puff by the user is detected, the controller 210 may generate ultrasonic waves to vaporize the liquid absorbed into the wick 140.

As still another example, the controller 210 may determine the heating temperature of the heater in response to a user input. For example, in a case in which the user selects a high level as a vapor production level, the controller 210 may increase the heating temperature of the heater, and in the opposite case, the controller 210 may decrease the heating temperature of the heater. As a result, vapor production may be provided according to the user's preferences, and thus the user's smoking satisfaction may be improved.

As yet another example, the controller 210 may analyze the user's puff pattern to determine the heating temperature of the heater. Here, the puff pattern may include a puff length, a puff intensity, or the like but is not limited thereto. As a specific example, in a case in which the puff length or puff intensity is increased, the controller 210 may increase the heating temperature of the heater. This is because longer or stronger inhalation by the user during smoking is highly likely to mean that the user is not satisfied with vapor production. In the opposite case, the controller 210 may decrease the heating temperature of the heater. Also, in a case in which the puff length or puff intensity is determined as being constantly maintained, the controller 210 may constantly maintain the heating temperature of the heater.

As yet another example, the controller 210 may control the heater on the basis of various combinations of the examples described above.

The detailed structure of the cartridge 10 according to some embodiments of the present disclosure has been described above with reference to FIGS. 3 and 4. Hereinafter, the structure of the control main body 20 will be described in detail below with reference to FIG. 5.

FIG. 5 is an exemplary view illustrating a detailed structure of the control main body 20 according to some embodiments of the present disclosure.

As illustrated in FIG. 5, the control main body 20 may include a main body case 230, the controller 210, the battery 220, and the ultrasonic vibrator 240. However, only the components relating to the embodiment of the present disclosure are illustrated in FIG. 5. Therefore, those of ordinary skill in the art to which the present disclosure pertains should understand that the control main body 20 may further include general-purpose components other than the components illustrated in FIG. 5. Hereinafter, each component of the control main body 20 will be described.

The main body case 230 may form an exterior of the control main body 20. The main body case 230 may be made of a suitable material to protect the components (e.g., the controller 210 and the battery 220) inside the main body case 230.

The descriptions of the controller 210 and the battery 220 will be omitted to avoid repeated description. Refer to the above descriptions relating to FIG. 1 for the descriptions of the controller 210 and the battery 220.

Next, the ultrasonic vibrator 240 may generate ultrasonic waves (i.e., ultrasonic vibrations) to vaporize the aerosol-forming substrate 1210 in a liquid state. For example, the ultrasonic vibrator 240 may be implemented as a piezoelectric element capable of converting electrical energy into mechanical energy and may generate ultrasonic waves according to control of the controller 210. Since those of ordinary skill in the art should clearly understand the principle of the ultrasonic vibrator 240, further description thereof will be omitted. The ultrasonic vibrator 240 may be electrically connected to the controller 210 and the battery 220.

In some embodiments, the ultrasonic vibrator 240 may have a flat shape and may be disposed to come in close contact with the wick 140 (see FIG. 6). In such a coupling structure, the vaporization area and vapor production may be maximized. Also, the ultrasonic vibrator 240 may be located in the vicinity of the open upper end portion of the control main body 20. In such a case, not only is it convenient and easy to clean the ultrasonic vibrator 240, but also it is easy for the ultrasonic vibrator 240 to come in close contact with the wick 140 as the control main body 20 is coupled to the cartridge 10.

Also, in some embodiments, the frequency of ultrasonic waves may be in a range of about 20 kHz to 1,500 kHz, in a range of about 50 kHz to 1,000 kHz, or in a range of about 100 kHz to 500 kHz. Within such numerical ranges, an appropriate vaporization rate and vapor production may be ensured.

Meanwhile, in some embodiments, as illustrated in FIG. 5, the control main body 20 may further include a damper 250 disposed in close contact with the ultrasonic vibrator 240. FIG. 5 illustrates an example in which two dampers 250 are disposed between the ultrasonic vibrator 240 and the main body case 230, but this is merely for convenience of understanding, and the number of dampers 250 may vary. For example, in a case in which the ultrasonic vibrator 240 has a disk shape, four dampers 250 may be disposed at 90° intervals, or a single damper 250 formed in a ring shape may be disposed to extend along the circumference of the disk-shaped portion. The damper 250 may serve to protect the ultrasonic vibrator 240 and absorb vibrations so that vibrations generated by the ultrasonic vibrator 240 are not transmitted to the main body case 230. Therefore, preferably, the damper 250 may be made of a material which is capable of absorbing vibrations, such as a silicone material.

Also, in some embodiments, as illustrated in FIG. 5, the damper 250 may be disposed to seal a gap between the main body case 230 and the ultrasonic vibrator 240. In such a case, it is possible to alleviate a problem in which a failure occurs in the control main body 20 due to a liquid (e.g., the liquid 1210) or a gas (e.g., an aerosol) leaking through the gap between the main body case 230 and the ultrasonic vibrator 240. For example, damage to the control main body 20 or a failure therein due to moisture may be prevented. In the embodiment, preferably, the damper 250 may be made of a material that is waterproofed or moisture-proofed.

The control main body 20 according to some embodiments of the present disclosure has been described above with reference to FIG. 5. Hereinafter, a detailed structure of the state in which the cartridge 10 and the control main body 20 are coupled to each other will be additionally described with reference to FIG. 6.

FIG. 6 is an exemplary view illustrating a detailed structure of the ultrasonic-based aerosol generation device 1 and the state in which the cartridge and control main body are coupled to each other according to some embodiments of the present disclosure. In order to avoid repeated description, the descriptions of the components of the aerosol generation device 1 will be omitted.

As illustrated in FIG. 6, the open lower end portion of the cartridge 10 and the open upper end portion of the control main body 20 may be connected to each other as the cartridge 10 and the control main body 20 are coupled to each other. Also, the wick 140 disposed in the cartridge 10 and the ultrasonic vibrator 240 disposed in the control main body 20 may come in close contact with each other. As described above, as the elastic body 150 in a compressed state is expanded, the wick 140 may be moved toward the ultrasonic vibrator 240, and as a result, the wick 140 and the ultrasonic vibrator 240 may come in close contact with each other. The elastic body 150 may allow the wick 140 to move toward the ultrasonic vibrator 240 and be evenly spread on the ultrasonic vibrator 240. Accordingly, the area of the wick 140 which is directly affected by the ultrasonic vibrator 240 may be significantly increased, and the vaporization rate and vapor production may also be increased.

The coupling state between the cartridge 10 and the control main body 20 has been described above with reference to FIG. 6. Hereinafter, an airflow path structure of the ultrasonic-based aerosol generation device 1 will be described with reference to FIG. 7.

FIG. 7 is an exemplary view illustrating an airflow path structure of the ultrasonic-based aerosol generation device 1 according to some embodiments of the present disclosure. FIG. 7 also illustrates a flow of air (e.g., outside air, aerosol) formed when a puff occurs.

As illustrated in FIG. 7, a first airflow path 191 through which outside air is introduced and a second airflow path 193 through which an aerosol is discharged to the outside may be formed in the aerosol generation device 1. Hereinafter, each of the airflow paths 191 and 193 will be described.

The first airflow path 191 may refer to a path through which outside air, introduced from the air hole 1310, passes through the vicinity of the center of the liquid reservoir 120 and reaches a central portion of an aerosol generation region 180. Here, the aerosol generation region 180 may refer to a region in which the outside air and the vaporized aerosol-forming substrate 1210 are mixed and aerosolized such that an aerosol is generated, and in the structure illustrated in FIG. 7, the aerosol generation region 180 may be formed in a space between the liquid reservoir 120 and the wick 140.

FIG. 7 illustrates an example in which streams of outside air introduced from the air holes 1310 at both side surfaces meet at an airflow tube and move to the center of the aerosol generation region 180. However, the number of air holes 1310 (or the number of first airflow paths 191) and the detailed structure of the first airflow path 191 may vary. For example, the number of air holes 1310 may be three or more, and the airflow paths may be formed so that the streams of outside air introduced through the air holes 1310 are separately moved to the vicinity of the center of the aerosol generation region 180.

Next, the second airflow path 193 may refer to a path through which an aerosol generated in the aerosol generation region 180 is discharged to the outside through the mouthpiece 110. More specifically, in the aerosol generation region 180, outside air and the vaporized aerosol-forming substrate 1210 may be mixed and aerosolized such that an aerosol is generated. The aerosol generated in this way may move from the outer periphery of the aerosol generation region 180 toward the mouthpiece 110 through the second airflow path 193.

FIG. 7 illustrates an example in which streams of aerosol moving through the two second airflow paths 193 meet at the mouthpiece 110 and are discharged to the outside of the mouthpiece 110. However, the number of second airflow paths 193 and the detailed structure thereof may vary. For example, the number of second airflow paths 193 may be three or more, and the streams of aerosol moving through the plurality of second airflow paths 193 may also be discharged to the outside without meeting at the mouthpiece 110.

Also, FIG. 7 illustrates a case in which the aerosol generated in the vicinity of the center of the aerosol generation region 180 passes through the elastic body 150 and moves to the vicinity of the outer periphery. Here, the aerosol may move to the vicinity of the outer periphery through a hole formed in the elastic body 150 or may move to the vicinity of the outer periphery by bypassing the elastic body 150. Such specific airflow paths may be designed and implemented in various ways.

In summary, the aerosol generation device 1 according to the embodiment may include the first airflow path 191 formed so that outside air is introduced into the vicinity of the center of the aerosol generation region 180 and the second airflow path 193 which allows the generated aerosol to be moved from the vicinity of the outer periphery of the aerosol generation region 180 toward the mouthpiece 110. Such an airflow path structure may generate a high-quality aerosol and also significantly increase vapor production, for the following reasons.

According to the airflow path structure described above, as outside air introduced into the vicinity of the center of the aerosol generation region 180 moves to the vicinity of the outer periphery of the aerosol generation region 180, the outside air sweeps across the entire surface of the wick 140 where vaporization occurs. Accordingly, vaporization is accelerated on the surface of the wick 140, and thus the vaporization rate and vapor production may be significantly increased.

Also, as the outside air sweeps across the entire surface of the wick 140, the outside air and the vaporized aerosol-forming substrate 1210 may be appropriately mixed, and thus a high-quality aerosol may be generated.

The airflow path structure of the aerosol generation device 1 according to some embodiments of the present disclosure has been described above with reference to FIG. 7.

The embodiments of the present disclosure have been described above with reference to the accompanying drawings, but those of ordinary skill in the art to which the present disclosure pertains should understand that the present disclosure may be embodied in other specific forms without changing the technical idea or essential features thereof. Therefore, the embodiments described above should be understood as being illustrative, instead of limiting, in all aspects. The scope of the present disclosure should be interpreted by the claims below, and any technical idea within the scope equivalent to the claims should be interpreted as falling within the scope of the technical idea defined by the present disclosure.

What is claimed is:

1. An ultrasonic-based aerosol generation device comprising:
- a liquid reservoir configured to store an aerosol-forming substrate in a liquid state;
- a wick configured to absorb the stored aerosol-forming substrate;
- an ultrasonic vibrator configured to vaporize the absorbed aerosol-forming substrate through ultrasonic waves to generate an aerosol; and
- a controller configured to control the ultrasonic vibrator,
- wherein at least a portion of the wick and at least a portion of the ultrasonic vibrator have a flat portion,
- wherein the liquid reservoir and the wick constitute at least a portion of a replaceable cartridge,
- wherein the ultrasonic vibrator and the controller constitute at least a portion of a control main body which is coupled to the cartridge,
- wherein the cartridge further comprises an elastic body configured to elastically support the wick, and a sealing member that seals an open lower end portion of the cartridge such that the elastic body is compressed by the sealing member,
- wherein, as the sealing member is removed, the elastic body is expanded and the flat portion of the wick is moved toward the ultrasonic vibrator, and
- wherein the elastic body is above the wick such that the wick is between the elastic body and the sealing member.

2. The ultrasonic-based aerosol generation device of claim 1, wherein a thickness of the flat portion of the wick is 1 mm or less.

3. The ultrasonic-based aerosol generation device of claim 1, wherein an area of the wick is larger than an area of the ultrasonic vibrator.

4. The ultrasonic-based aerosol generation device of claim 1, wherein the flat portions of the wick and the ultrasonic vibrator are disposed to come in close contact with each other.

5. The ultrasonic-based aerosol generation device of claim 1, wherein:
- the flat portion of the wick is a central portion of the wick; and
- the ultrasonic-based aerosol generation device further comprises a damper which is disposed on an outer peripheral portion of the wick to fix the outer periphery portion of the wick.

6. The ultrasonic-based aerosol generation device of claim 1, further comprising a damper which is disposed in close contact with the ultrasonic vibrator to absorb vibrations of the ultrasonic vibrator.

7. The ultrasonic-based aerosol generation device of claim 6, further comprising a case forming an exterior of the aerosol generation device,
- wherein the ultrasonic vibrator is located below the wick, and
- the damper is disposed to seal a gap between the case and the ultrasonic vibrator.

8. The ultrasonic-based aerosol generation device of claim 1, wherein:
- an aerosol generation region is formed adjacent to the flat portion of the wick, and
- the ultrasonic-based aerosol generation device further comprises:
  - a first airflow path through which outside air is introduced into a vicinity of a center of the aerosol generation region; and
  - a second airflow path through which the generated aerosol is moved from a vicinity of an outer periphery of the aerosol generation region toward a mouthpiece.

9. The ultrasonic-based aerosol generation device of claim 8, wherein:
- the second airflow path includes a plurality of airflow paths; and
- streams of aerosol moved through the plurality of airflow paths meet at the mouthpiece and are discharged to the outside.

10. The ultrasonic-based aerosol generation device of claim 1, wherein:
- an open upper end portion of the control main body is coupled to a lower portion of the cartridge; and
- the ultrasonic vibrator is located in a vicinity of the open upper end portion.

11. The ultrasonic-based aerosol generation device of claim 1, wherein, before being coupled to the control main body, the cartridge is sealed by a sealing member in a state in which the elastic body is compressed.

12. The ultrasonic-based aerosol generation device of claim 1, further comprising a heater configured to heat the absorbed aerosol-forming substrate.

13. The ultrasonic-based aerosol generation device of claim 1, wherein a first end of the elastic body contacts the liquid reservoir, and a second end of the elastic body, opposite of the first end, contacts the wick.

14. The ultrasonic-based aerosol generation device of claim 1, wherein the replaceable cartridge further comprises a mouthpiece configured to come into contact with a mouth of a user and allow the user to inhale the aerosol.

* * * * *